United States Patent [19]

Funayama et al.

[11] Patent Number: 5,079,323

[45] Date of Patent: Jan. 7, 1992

[54] POLYSILOXAZANES, SILICON OXYNITRIDE FIBERS AND PROCESSES FOR PRODUCING SAME

[75] Inventors: Osamu Funayama; Mikiro Arai; Hayato Nishii, all of Iruma; Takeshi Isoda, Niizi, all of Japan

[73] Assignee: Toa Nenro Kogyo Kabushiki Kaisha, Tokyo, Japan

[21] Appl. No.: 555,067

[22] Filed: Jul. 18, 1990

Related U.S. Application Data

[62] Division of Ser. No. 382,713, Jul. 19, 1989, Pat. No. 4,965,058.

[30] Foreign Application Priority Data

Feb. 12, 1986 [JP] Japan .................. 61-026881

[51] Int. Cl.$^5$ ............................................. C08G 77/00
[52] U.S. Cl. ........................................ 528/10; 528/19; 528/21; 528/23; 528/31; 525/474; 423/324; 423/325
[58] Field of Search .................. 423/324, 325; 528/10, 528/31, 19, 21, 23; 525/474

[56] References Cited

U.S. PATENT DOCUMENTS 4,869,858  9/1989  Funayama et al. ................... 528/31
4,965,058 10/1990  Funayama et al. ................. 423/325

Primary Examiner—Melvyn I. Marquis
Attorney, Agent, or Firm—Michael N. Meller

[57] ABSTRACT

Novel polysiloxazanes comprising $+(SiH_2)_n NH+$ and $+(SiH_2)_m O+$ as the main repeating units are provided. The polysiloxazanes are produced by reacting a dihalosilane or an adduct thereof with a Lewis base, with ammonia and water vapor or oxygen. From the polysiloxazane, novel silicon oxynitride shapes can be produced and the silicon oxynitride shapes are essentially composed of silicon, nitride (5 mol % or more) and oxygen (5 mol % or more).

1 Claim, 4 Drawing Sheets

CP/MAS $^{29}$Si-NMR SPECTRUM OF POLYSILOXZANES

POWER X-RAY SPECTRUM OF BLACK INORGANIC(Si-N-O)FIBERS

POLYSTYRENE-EQUIVALENT MOLECULAR WEIGHT

CHROMATOGRAM BY GPC OF POLYSILOXAZANES

POLYSILOXAZANES, SILICON OXYNITRIDE FIBERS AND PROCESSES FOR PRODUCING SAME

This is a division of application Ser. No. 382,713 filed July 19, 1989 and now U.S. Pat. No. 4,965,058.

BACKGROUND OF THE INVENTION

1. Field of the Invention

The present invention relates to polysiloxazanes, silicon oxynitride fibers, and processes for producing the same. Polysiloxazanes, when formed into fibers, are useful among others as the precursor of silicon oxynitride fibers, which are useful for the reinforcement of various composite materials strongly demanded by many industries, including those related to transportation, energy, metals and aerospace.

2. Description of Related Art

New ceramic materials such as silicon carbide and silicon nitride have been attracting much attention for their favorable properties, and the research thereof has recently made remarkable development. Silicon oxynitride is another type of new ceramic material, which is known to be as heat-resistant as, and more oxidation-resistant than, silicon carbide and nitride. Some of more important processes, among a number of others which have been proposed for the synthesis of silicon oxynitride, are:

(1) A process wherein a mixture of metallic silicon and silicon dioxide as the starting material is nitrided in the presence of an alkaline earth metal or alkali metal fluoride in a nitrogen atmosphere at 1150° to 1350° C. (Japanese Unexamined Patent Publication (Kokai) No. 47-42400/1972 by Tada). In another process, another metal for example, iron, copper, manganese, nickel, magnesium or aluminum, is added to the feed mixture of metallic silicon and silicon dioxide, which is heated in a nitrogen atmosphere to form discontinuous fibers or whiskers (Japanese Unexamined Patent Publication (Kokai) Nos. 50-29498/1975, 51-129898/1978 and 53-79799/1978, all by Azuma).

(2) A process, wherein polycarbosilanes are formed into fibers, which are treated, after being cured by oxidation, with ammonia at 800° to 1400° C. to form continuous fibers of silicon oxynitride having a structures of $SiN_{1.5}O_{0.47}$. (Okamura et al, Chemistry Letters, pp, 2059 to 2060, 1984).

The above process (1) is, however, not a process which provides a continuous fiber of oxynitride. The ability to form a continuous fiber is extremely advantageous, since not only oxynitride but also other ceramic materials have a remarkably increased mechanical strength and provide an increased shapeability when formed into a fibrous form.

The above Process (2) is a process which provides continuous fibers of silicon oxynitride. However, the process is complex and there is a strong desire for an improvement of this process.

SUMMARY OF THE INVENTION

The main object of the present invention is to provide a simple process for producing continuous silicon oxynitride fibers.

The inventors have made intensive and extensive investigations in order to attain the above object, and have found that, by providing novel polysiloxazanes and making continuous fibers with the novel polysiloxazanes as the starting material, continuous silicon oxynitride fibers having desired properties can be produced by a simple process. As a result, the present invention has been attained. As a result, the present invention has been attained. The present invention provides novel polysiloxazanes comprising $[(SiH_2)_nNH\text{-}]$ and $[(SiH_2)_mO\text{-}]$ as the main repeating units where each of n and m has a value of 1, 2 or 3, preferably 1 or 2. These novel polysiloxazanes, which can be easily formed into continuous fibers, are produced by a process according to the present invention, in which at least one of a dihalosilane and an adduct of a dihalosilane with a Lewis base is reacted with ammonia and at least one of water and oxygen to form the polysiloxazanes.

In other aspects of the present invention, silicon oxynitride fibers, which may be continuous fibers, are produced by a process in which at least one of a dihalosilane and an adduct of a dihalosilane with a Lewis base is reacted with ammonia and at least one of water and oxygen to form polysiloxazanes, and the polysiloxazanes are spun and fired to form silicon oxynitride fibers. Alternatively, silicon oxynitride fibers can be produced by a process in which at least one of a dihalosilane and an adduct of a dihalosilane with a Lewis base is reacted with ammonia to form polysilazanes, the polysilazanes are spun and then treated with at least one of water and oxygen to form polysiloxazane fibers, and the polysiloxazane fibers are fired to form silicon oxynitride fibers. The silicon oxynitride fibers thus produced are essentially comprised of silicon, nitride and oxygen, the content of each of the nitrogen and oxygen being 5 mole % or more, the chemical composition of the silicon oxynitride fibers being expressed by the following formula (1):

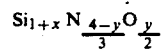

wherein $0<x<3$ and $0<x<4$. Depending on the starting dihalosilane and the composition thereof, the silicon oxynitride fibers may contain a certain amount of carbon. We believe silicon oxynitride fibers containing a less amount, e.g., less than 5 mole %, of carbon has not been produced yet. Thus, according to the present invention, novel silicon oxynitride fibers are provided, which are composed essentially of silicon, nitrogen, oxygen and carbon, the content of each of the nitrogen and oxygen being 5 mole % or more, the chemical composition of the silicon oxynitride fibers being as follow:

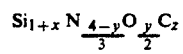

wherein $0<x<3$ and $0<x<4$ and $z<1.1$, preferably $z<0.2$.

The dihalosilane used in the present invention is preferably selected from dihalomonosilanes and dihalodisilanes of the general formulae: $SiH_2X_2$ and $Si_2H_4X_2$, where X is F, Cl, Br or I. Among these dihalosilanes, dichlorosilane is more preferable. The dihalosilane may be reacted with a base to form an adduct. The bases usable in the present invention are those which preferentially react with a dihalosilane to form an adduct. Examples of these bases include Lewis bases, i.e., tertiary amines (e.g., trialkyl amine, pyridine, pycoline and derivatives thereof), secondary amines having groups with steric hindrance, phosphine, stibine and arsine, and derivatives of these (e.g., trimethylphosphine, dimethylethylphosphine, methyldiethylphosphine, triethylphosphine, trimethylarsine, trimethylstibine, triethylamine, thiophene, furan, dioxane, selenophene, 1-methylphosphol, etc.). Among them, a base having a low boiling point and being less basic than ammonia (e.g., pyridine, picoline, trimethylphosphine, dimethylethylphosphine, methyldiethylphosphine, trithylphosphine, thiophene, furan, dioxane, selenophene, 1-methylphosphol), is preferred. Particularly, pyridine and picoline are preferred from the viewpoints of handling and economy. The amount of the base to be used is not particularly limited, and it is sufficient if the amount of the base including the base in the adduct is more than the stoichemical amount to react with the dihalosilane, in other words, the molar ratio of the base to the dihalosilane is higher than 2 to 1.

For example, when dichlorosilane is added to pyridine, a white solid adduct represented by the formula, $SiHCl_2 \cdot 2C_5H_5N$ is formed. This product is reacted with ammonia and one of water and oxygen to form hydropolysiloxazanes soluble in a relevant solvent. Ammonia and one of water and oxygen may be reacted with a dichlorosilane simultaneously or successively in a certain order. Both water and oxygen may be used. Alternatively, the above product, the white solid adduct, is first reacted with dry and deoxygenized ammonia to prepare an intermediate polysilazane, and then reacted with one of water and oxygen to form a hydropolysiloxazane soluble in a solvent.

The polysiloxazanes thus formed are copolymers generally in a composite structure comprising linear and cyclic polymers, having $[(SiH_2)_n NH\text{-}]$ and $[(SiH_2)_m O\text{-}]$ as the main repeating units. The chemical structures of the polysiloxazanes vary depending on the starting material used. For example, when dichloromonosilane is used as the starting material, the product polymer will have $\text{-}(SiHNH)\text{-}$ and $\text{-}(SiH_2N)\text{-}$ as the main repeating units. When dichlorodisilane is used as the starting material, the product polymers will have $\text{-}(SiH_2SiH_2NH)\text{-}$ and $\text{-}(SiH_2SiH_2O)\text{-}$ as the main repeating units. A unit of the formula,

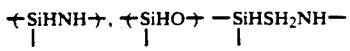

or the like is present at a bond between the cyclic and linear polymers or sequences, and a —NH, —OH or —SiH$_3$ group is present at an end of the polymers. If hydrazine, etc. in addition to ammonia are used to react with a dihalosilane or an adduct thereof, the product polymers can contain a part of $[(SiH_2)_n(NH)_r\text{-}]$, e.g., $[(SiH_2)_n NHNH\text{-}]$ structure. Furthermore, it should be noted that a dihalosilane having one or more organic groups, such as hydrocarbon, ether, ester or carbonyl groups, in an amount of 10% or less, can be used in the starting material. These organic groups will remain in the product polysiloxazanes.

The contents of $[(SiH_2)_n NH\text{-}]$ and $[(SiH_2)O\text{-}]$ are not limited and the arrangement thereof is not necessarily regular, in that, in practice, it is often irregular. The ratio of $[(SiH_2)_n NH\text{-}]$ to $[(SiH_2)_m O\text{-}]$ may be controlled by changing the ratio of ammonia to at least one of water and oxygen.

The average polymerization degree of the polysiloxazane is 4 to 300 or more, based on the number of the repeating units of $[(SiH_2)_n NH\text{-}]$ and $[(SiH_2)_m O\text{-}]$. The average polymerization degree of the polysiloxazane can be controlled by changing the concentration of the dihalosilane, the reaction temperature, and the solvent, etc. Generally, if an average polymerization degree of polymers is very high, handling of the polymers becomes difficult due to easy gelation of the polymers.

When a dihalosilane having no organic group is used as the starting material according to the present invention, the product polysiloxazanes usually have the following composition.
H: 50 to 60 mole %
Si: 20 to 25 mole %
O: 0 to 25 mole % (excluding 0 mole %)
N: 0 to 20 mole % (excluding 0 mole %)

When a part of the dihalosilane has an organic group, a part, preferably 10% or less, of the hydrogen atoms are replaced by the organic group. In this case, the above composition of the polysiloxazanes is changed so that a part, preferably 10% or less, of the 50 to 60 mole % of the hydrogen is replaced by the organic group where the amount of the organic group is calculated based on the molar amount of the organic group itself.

Stock et al. studied the production of polysilazanes and polysiloxanes from dichlorosilane [Ber. 54 (1921), 740 and Ber. 52 (1919), 695], and synthesized oligosiloxanes by reacting dichlorosilane dissolved in benzene with ammonia to form an oligosilazane comprising a repeating unit $\text{-}(SiH_2NH)\text{-}$ and then hydrolyzing this product to form the oligosiloxanes comprising $\text{-}(SiH_2O)\text{-}$. On the other hand, Seyferth et al synthesized polysilazanes or polysiloxanes by reacting a solution of dichlorosilane in dichloromethane with ammonia or water [Communication of AM. Ceram. Soci. Jan. (1983) C-13 and Inorg. Chem. (1983) 22, 2163–2167]. The inventors produced high-molecular-weight polysilazanes by the ammonolysis of a basic adduct of dichlorosilane (see the specification of Japanese Unexamined Patent Publication (Kokoku) No. 60-145903/1985). The polymers of the present invention are copolymers of silazanes and siloxanes, which are completely different from the polysiloxanes as mentioned above.

The copolymers of the present invention are novel, irrespective of the ratio of $[(SiH_2)_n NH\text{-}]$ to $[(SiH_2)_m O\text{-}]$. The copolymers containing 1 mole % or more, based on the silicon atoms, of silicon bonded with nitrogen and 1 mole % or more of silicon bonded with oxygen are also novel.

In the production of the silicon oxynitride fibers from the polysiloxazanes according to the present invention, the polysiloxazanes are dissolved in a suitable solvent to obtain a spinning solution. The solvents may be, for example, hydrocarbons, halogenated hydrocarbons, ethers, nitrogen compounds and sulfur compounds. Examples of preferred solvents include hydrocarbons such as pentane, hexane, isohexane, methylpentane, heptane, isoheptane, octane, isooctane, cyclopentane, methylcyclohexane, benzene, toluene, xylene and ethylbenzene; halogenated hydrocarbons such as methylene chloride, chloroform, carbon tetrachloride, bromoform, ethylene chloride, ethylidene chloride, trichloroethane, tetrachloroethane and chlorobenzene; ethers such as ethyl ether, propyl ether, ethyl butyl ether, butyl ether, 1,2-dioxyethane, dioxane, dimethyloxane, tetrahydrofuran, tetrahydropyran and anisole; nitrogen compounds such as diethylamine, triethylamine, dipropylamine, diisopropylamine, butylamine, aniline, piperidine, pyridine, picoline, lutidine, ethylenediamine and propylenediamine; and sulfur compounds such as carbon disulfide, diethyl sulfide, thiophene and tetrahydrothiophene.

The concentration of the polysiloxazanes in the spinning solution is controlled so that the solution has a viscosity in the range between 1 and 5000 poise. If necessary, a small amount of a spinning agent may be added to the spinning solution in order to improve the spinnability of the polysiloxazanes. Examples of the spinning agents include polyethers, polyamides, polyesters, vinyl polymers, polythioethers and polypeptides. Among them, polyethylene oxide, polyisobutylene, polymethyl methacrylate, polyisoprene, polyvinyl acetate and polystyrene are particularly preferred. The solution is concentrated by an ordinary process such as vacuum distillation to adjust the viscosity of the spinning solution. The spinning solution prepared in this way contains 5 to 90 wt. % of polysiloxazanes.

The spinning is effected advantageously by the dry spinning process. In addition, a centrifugal or blow spinning process can be employed. The spinning is effected in an inert gas atmosphere at room temperature or, if necessary, by heating the spinning solution. In the latter case, great care must be taken, since the thermal decomposition of the polysiloxazane starts at above 100° C. After the spinning, the fibers are dried by heating under a reduced pressure.

Thus, fibers, particularly continuous fibers, of polysiloxazanes are produced. These fibers are white in color and have a sufficiently high strength that silicon oxynitride products can be produced by a process in which the fibers are formed into yarns or woven fabrics followed by firing.

Dry polysiloxazane fibers are desirably heat-treated at around 100° C. in an inert gas atmosphere. This heat treatment is effected to ensure removal of the solvent from the fibers and to accelerate the crosslinking of the polysiloxazane molecular chains, in order to minimize the formation of cracks, voids and pores during the firing step.

The polysiloxazane fibers prepared by the process of the present invention can be fired directly in an atmospheric gas, since they are infusible by heat. The atmospheric gas is preferably nitrogen, but ammonia or a gaseous mixture of nitrogen, ammonia, argon, hydrogen, etc., may be also used. The white fibers, when fired at 800° C. or higher in the inert atmosphere, turn into white or black inorganic fibers which essentially comprise silicon, nitrogen (5 mole % or more) and oxygen (5 mole % or more), with the chemical composition represented by the formula (1), and typically have the following properties:

fiber diameter: 5 to 50 $\mu$m
tensile strength: 30 to 300 kg/mm$^2$
modulus of elasticity: 7 to 30 tons/mm$^2$
resistivity: 2 to 7 × 10$^{10}$ $\Omega$·cm These are similar to those of the silicon nitride fibers the inventors disclosed in Japanese Patent Application No. 60-257,824/1985, but their oxidation resistance is considerably higher.

For example, when the fibers obtained in Example 1 given below were heated at 700° C. in the air for 5 hrs, the weight thereof was increased by 2.6%. For comparison, the silicon nitride fibers mentioned-above were treated under the same conditions, and the weight gain was 4.8%.

The silicon oxynitride fibers having the new composition can be produced also by a process other than the above. For example, the new silicon oxynitride fibers of the present invention can be produced by ammonolyzing a dihalosilane such as one represented by the formula: SiH$_2$X$_2$ or Si$_2$H$_4$X$_2$, where X represents F, Cl, Br or I, directly or in the form of an adduct thereof with a Lewis base, spinning the resulting polysilazanes to form polysilazane fibers, reacting the fibers with oxygen or water vapor to a suitable degree to form polysiloxazane fibers and heat-treating them. The polysilazane fibers formed as above are reacted with water vapor or oxygen at ambient temperature, during which the —NH— group in the polysilazanes is substituted by an —O— group. Therefore, the polysilazane fibers can be converted into the polysiloxazane fibers, when exposed to a certain temperature for a certain time period. The polysiloxazane fibers prepared in this way are also novel, with [(SiH$_2$)$_n$NH] and [(SiH$_2$)$_m$O] as the main repeating units, and with an average polymerization degree of at least 4 to 1700 or more (See the specification of Japanese Patent Application No. 60-257824/1985).

The [(SiH$_2$)$_n$NH]/[(SiH$_2$)$_m$O] ratio will widely vary from the surface to the core of the formed polysiloxazanes, depending on the treatment conditions. It is possible to distribute polysiloxane to the surface and polysilazane to the core by carefully selecting the conditions of treatment with water or oxygen.

The process for producing the polysilazane fibers from the polysilazanes may be similar to the process for producing the polysiloxazane fibers from the polysiloxazane, described before. The process for producing the silicon oxynitride fibers from the polysiloxazane fibers may be the same in this process and the process described before.

Figure 1:
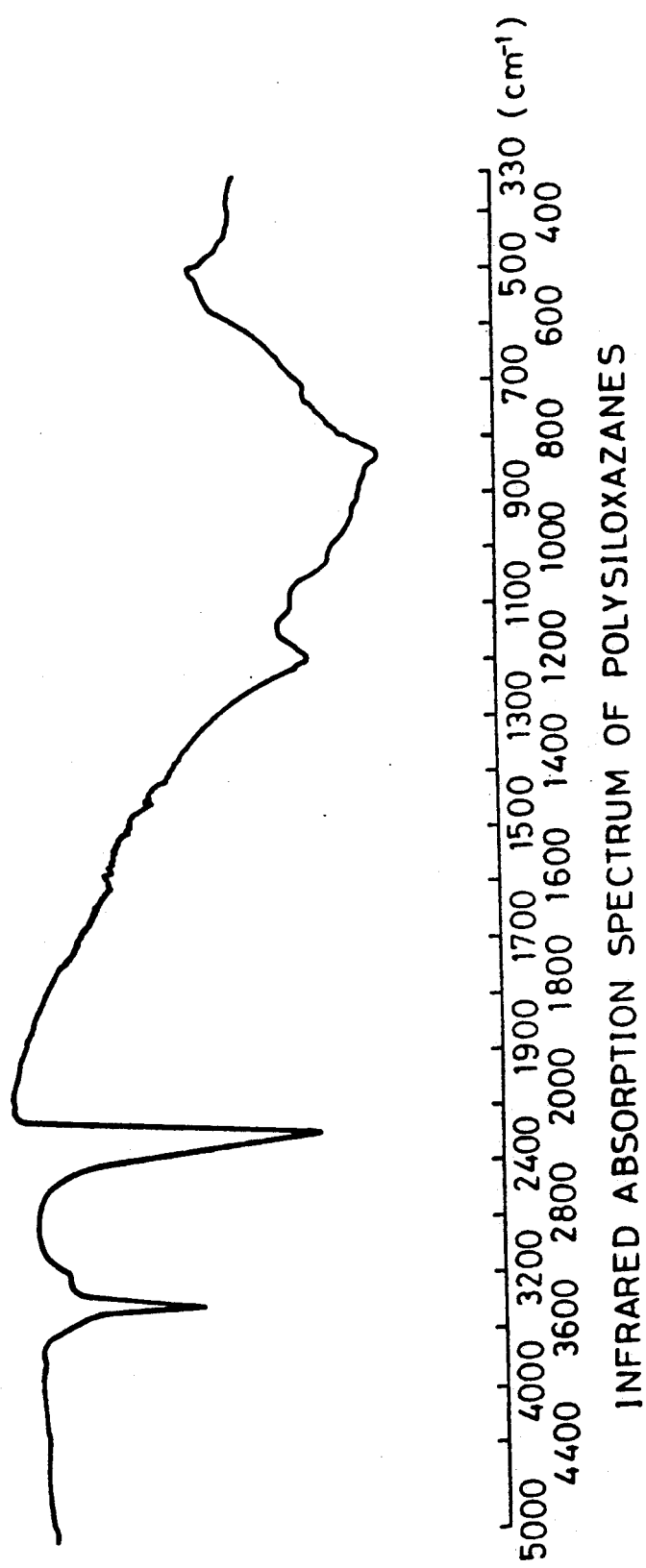
FIG. 1 is an infrared absorption spectrum of polysiloxazanes

The present invention provides new polysiloxazanes, silicon oxynitride fibers, and processes for producing them. The polysiloxazanes are starting materials suitable for the production of silicon oxynitride fibers, particularly continuous silicon oxynitride fibers, on an industrial scale. Thus, according to the present invention, the polysiloxazane fibers useful as precursors of the continuous silicon oxynitride fibers can be produced easily and the obtained silicon oxynitride fibers are quite useful as a reinforcing material for high-performance composite materials.

The following examples further illustrate the present invention, but by no means limit the invention.

EXAMPLE 1

A 300-ml four-necked flask was equipped with a gas-inlet tube, a mechanical stirrer and a Dewar condenser. 150-ml of dry pyridine was charged into the flask and cooled with ice. 15.8 g (0.156 mole) of dichlorosilane was then added to the pyridine in the flask over about 1 hr to form a white solid adduct (SiH$_2$Cl$_2$.2C$_5$H$_5$N). The reaction mixture was cooled with ice, to which 15.7 g (0.92 mole) of ammonia and 0.33 g (0.018 mole) of water carried by nitrogen gas was blown with stirring the reaction mixture over about 1.5 hrs.

On completion of the reation, the reaction mixture was separated centrifugally in a nitrogen gas atmosphere into the supernatant and residual phases. The residual phase was washed with dry methylene chloride to extract remaining perhydropolysilazanes and the extract (the wash) was combined with the supernatant phase. The mixture was then subjected to filtration in a nitrogen atmosphere. The resultant filtrate contained 2.01 g/100 ml of the polysiloxazanes, whose composition is shown in Table 1.

30 mg of polyethylene oxide having an average molecular weight of about 5,000,000 was dissolved in 150 ml of the filtrate. The solution was concentrated by distilling off the solvent under a reduced pressure to obtain a spinning solution containing about 30 g/100 ml of the polysiloxazanes, the viscosity of the spinning solution being 250 poise. The spinning solution was filtered, defoamed and processed by dry spinning in a nitrogen atmosphere to obtain white polysiloxane fibers.

The fibers were dried at 50° C. under a reduced pressure for 4 hrs, heat treated at 100° C. in a nitrogen atmosphere for 3 hrs, and heated at 1000° C. in a nitrogen atmosphere for 5 hrs to obtain black fibers.

The black fibers having a diameter of 5 to 50 μm had a tensile strength of 30 to 280 kg/mm$^2$ and modulus of elasticity of 8 to 20 ton/mm$^2$.

The number-average molecular weight of the product determined by vapor pressure depression was about 1100. According to gel permeation chromatography (GPC), the polystyrene-equivalent average molecular weight of the product was between 250 and 4,000, mainly distributed in the range between 300 and 3,400, and the number-average molecular weight, polystyrene-equivalent was 785. The average polymerization degree was in a range between 7.8 and 125, mainly between 9.4 and 106.5, as determined with polystyrene-equivalent molecular weights adjusted by vapor pressure depression.

The element composition (mole %) of the black fibers determined by chemical analysis are shown in Table 1.

TABLE 1

| | Si | N | O | H |
|---|---|---|---|---|
| | | | | (unit: mole %) |
| Polysiloxazanes | 20.8 | 18.2 | 2.3 | 58.9 |
| Black fibers | 49.3 | 44.0 | 6.0 | 0.0 |

Figure 2:
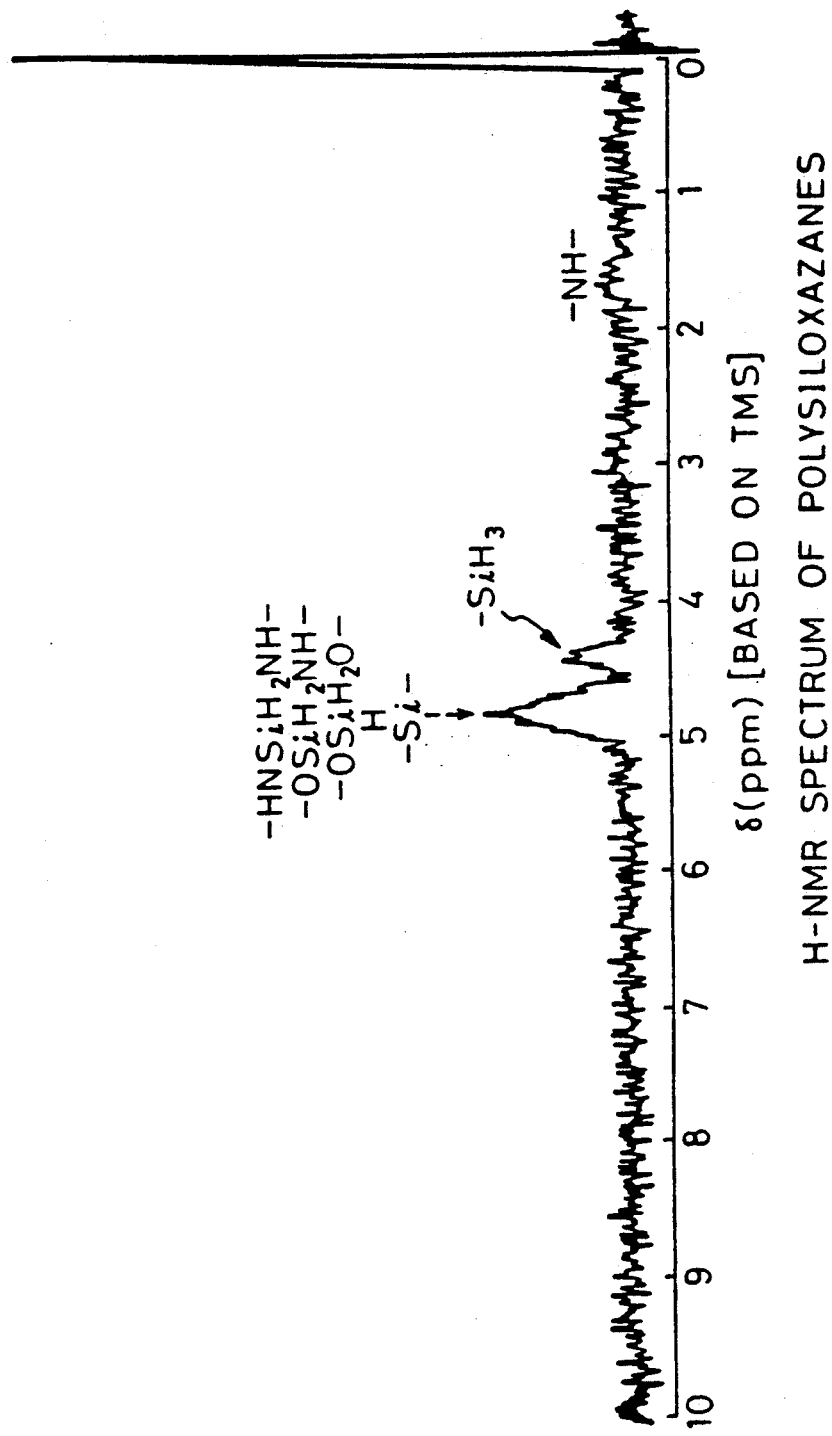
FIG. 2 is an H-NMR spectrum of polysiloxazanes
Figure 3:
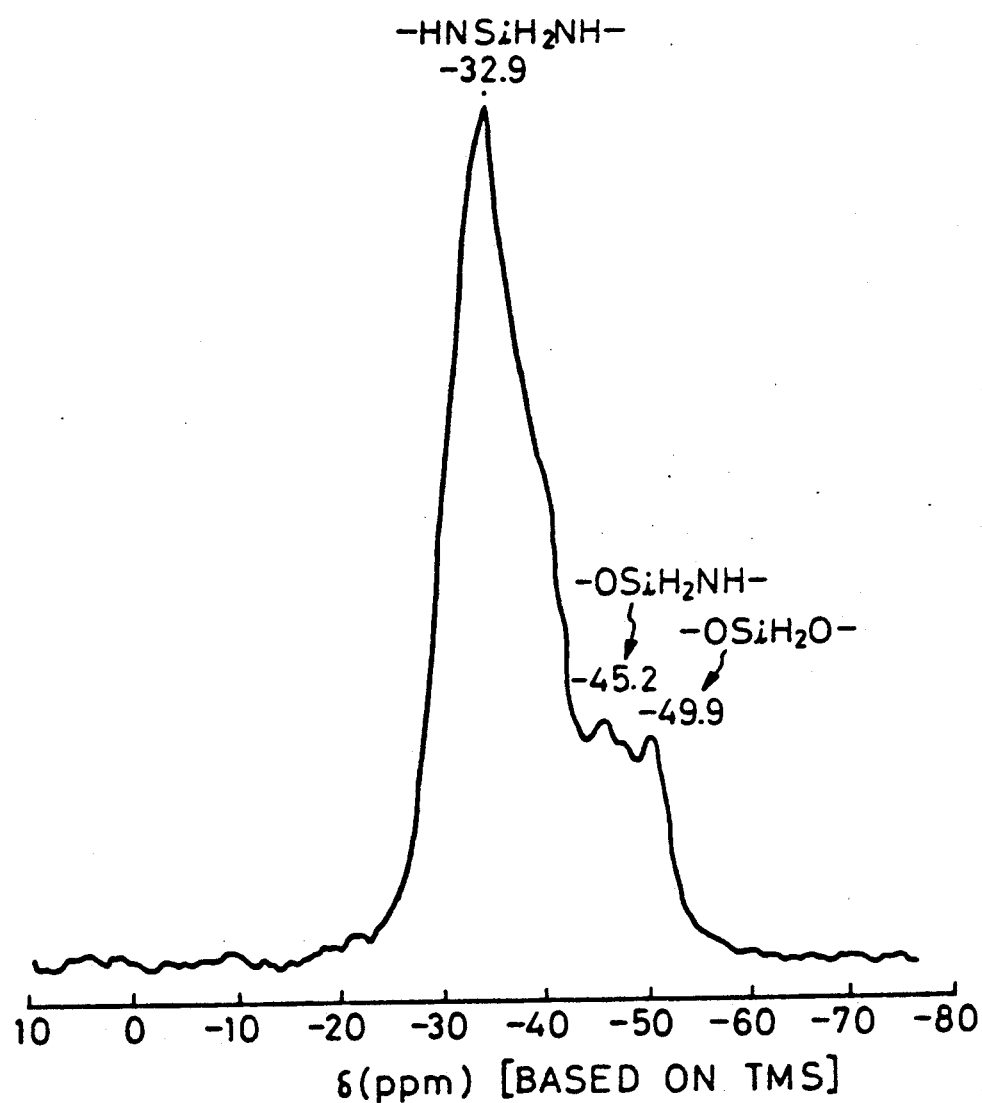
FIG. 3 is a CP/MRS$^{29}$Si-NMR spectrum of polysiloxazanes
Figure 4:
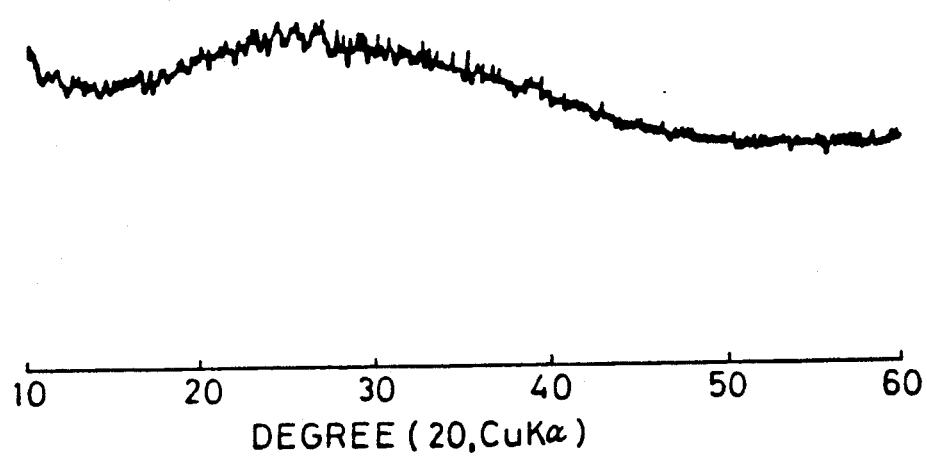
FIG. 4 is a power X-ray spectrum of black inorganic (Si—N—O) fibers
Figure 5:
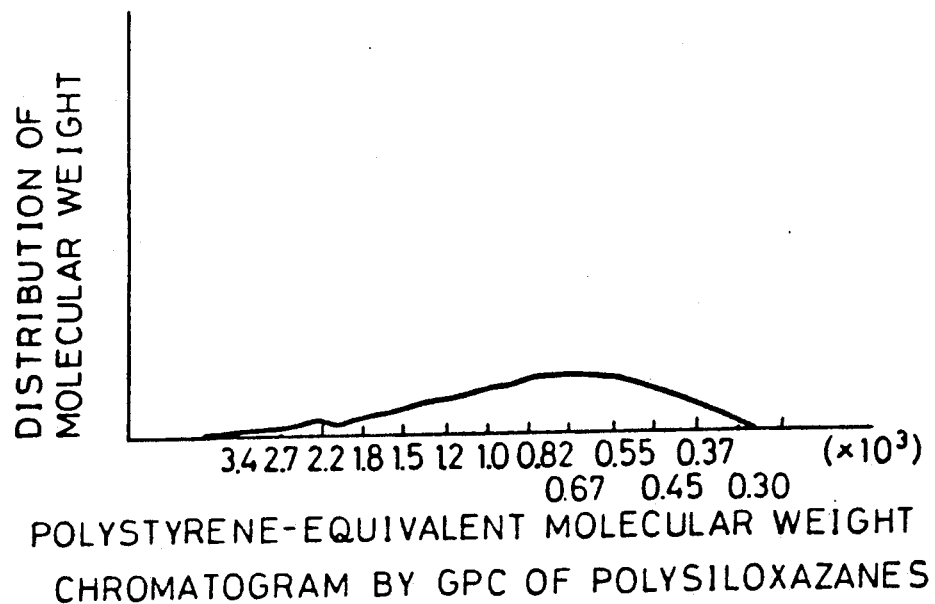
FIG. 5 is a polystyrene-equivalent molecular weight chromatogram by GPC of polysiloxazanes.

FIGS. 1 to 3 show the infrared absorption spectrum, $^1$H-NMR, and CP/MAS$^{29}$Si-NMR, respectively, of the polysiloxazanes, and FIG. 4 shows the powder X-ray diffraction spectrum of the black fibers. The $^1$H-NMR spectrum in FIG. 1 was obtained from polysiloxazanes which were soluble in the solvent used in the analysis, CDCl$_3$.

EXAMPLE 2

The polysiloxazane fibers obtained in Example 1 were treated under the same conditions as in Example 1, except for the drying temperature, and were fired at 1300° C. The resultant black fibers comprised the element composition of 44.4 mole % of Si, 48.6 mole % of N and 7.4 mole % of O. According to the powder X-ray diffractometry of the black fibers, peaks of Si, α-Si$_3$N$_4$ and β-Si$_3$N$_4$ were observed. Peaks of silicon oxynitride (Si$_2$N$_2$O) were observed when the polysiloxazane fibers were fired at 1600° C. or higher.

EXAMPLE 3

An adduct was prepared under the same conditions as in Example 1 except that 150 ml of pyridine mixed with 1.00 g (0.056 mole) of water was used, and polysiloxazanes and black fibers therefrom were prepared in the same manner as in Examples 1 and 2.

The elementary compositions of the polysiloxazanes and the black fibers are shown in Table 2.

TABLE 2

| | Si | N | O | H |
|---|---|---|---|---|
| | | | | (unit: mole %) |
| Polysiloxazanes | 21.5 | 14.3 | 7.7 | 57.2 |
| Black fibers fired at 1000° C. | 48.4 | 30.4 | 21.2 | 0.0 |
| Black fibers fired at 1300° C. | 46.7 | 41.6 | 11.7 | 0.0 |

EXAMPLE 4

An adduct was prepared under the same conditions as in Example 1, to which 16.0 g (0.94 mole) of dry ammonia carried by nitrogen gas was added over 1.5 hrs. After completion of the reaction, the filtrate containing 1.95 g/100 ml of polysilazanes was obtained in the same manner as in Example 1, and was spun in the same manner as in Example 1 to form polysilazane fibers, which were kept in an atmosphere having a humidity of 47% for 5 hrs, and then dried under a reduced pressure, heat-treated, and fired in the same manner as in Example 1, to form black fibers.

The resultant black fibers had the element composition of 54.0 mole % of Si, 26 mole % of N, and 20.0 mole % of O.

EXAMPLE 5

An adduct was prepared under the same conditions as in Example 1, to which dry ammonia carried by nitrogen gas was blown over about 2 hrs. After completion of the reaction, the reaction mixture was centrifugally separated in a nitrogen atmosphere into the supernatant and remaining phases. The remaining phase was washed with o-xylene and the mixture of the wash with the supernatant phase was filtered under a nitrogen atmosphere. 1.0 g (0.056 mole) of water in pyridine was added to the filtrate slowly enough to prevent a vigorous bubbling of ammonia and hydrogen produced by the reaction. After completion of the bubbling the reaction solution was placed in a 500 ml egg-plant type flask, followed by removing pyridine by a rotary evaporator and adding o-xylene to obtain 150 ml of an xylene solution. 260 mg of polyethyl methacrylate having the average molecular weight of about 350,000 as a spinning agent was then added to the solution and the solution was concentrated by vacuum evaporation to contain about 90% of polysiloxazane. The concentrated solution was spun and heat treated as in Example 1, and fired at 950° C. for 5 hrs in a nitrogen atmosphere to form brown fibers.

The brown fibers had the element composition of 38.0 mole % of Si, 36.8 mole % of N, 18.4 mole % of O, and 4.9 mole % of C. The content of carbon depended on the amount of the spinning agent added.

EXAMPLE 6

The polysiloxazane fibers obtained in Example 1 were kept in an atmosphere having a humidity of 47% for 15 hrs and treated in the same manner as in Example 1 to form black fibers. The black fibers had an element composition of 48.5 mole % of Si, 7.5 mole % of N and 44.0 mole % of O.

We claim:

1. Polysiloxazanes comprising copolymers having $[(SiH_2)_nNH]$ and $[(SiH_2)_mO]$ as the main repeating units where each of n and m has a value of 1, 2 or 3, containing at least 1 mole % of $[(SiH_2)_mO]$ repeating unit and having an average polymerization degree based on repeating units of 9.4 to 300; wherein the copolymers have part of a linear sequence and cyclic sequence; wherein the polysiloxazanes are composed of 50 to 60 mole % of hydrogen, 20 to 25 mole % of silicon, from greater than O mole % up to 25 mole % of oxygen, and from greater than O mole % up to 20 mole % of nitrogen; and wherein 10% or less of the repeating units of the copolymers have the structure $[(SiHR)_nNH]$ and $[(SiHR)_mO]$ wherein R is selected from the organic group consisting of hydrocarbon, ether, ester and carbonyl (10% or less of said 50 to 60 mole % of the hydrogen is substituted by an organic group where the organic group is calculated based on the mole amount of the organic group itself).

* * * * *